(12) United States Patent
Chraplyvy et al.

(10) Patent No.: US 7,145,715 B2
(45) Date of Patent: Dec. 5, 2006

(54) MULTIPLE PUMP PARAMETRIC APPARATUS HAVING NO IDLER BROADENING

(75) Inventors: Andrew R. Chraplyvy, Matawan, NJ (US); Alan H. Gnauk, Middletown, NJ (US); Robert M. Jopson, Rumson, NJ (US); Stojan Radic, Del Mar, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 139 days.

(21) Appl. No.: 10/948,038

(22) Filed: Sep. 23, 2004

(65) Prior Publication Data

US 2006/0061853 A1    Mar. 23, 2006

(51) Int. Cl.
*G02F 1/39* (2006.01)
*G02F 1/01* (2006.01)
(52) U.S. Cl. ...................... 359/330; 359/279
(58) Field of Classification Search ........ 359/326–332, 359/279
See application file for complete search history.

(56) References Cited

U.S. PATENT DOCUMENTS 5,386,314 A * 1/1995 Jopson ..................... 359/326

2004/0042060 A1 * 3/2004 McKinstrie et al. ......... 359/330
2005/0146780 A1 * 7/2005 McKinstrie et al. ......... 359/330

OTHER PUBLICATIONS

Radic et al, "Selective Suppression of Idler Spectral Broadening in Two-Pump Parametric Architectures", IEEE Photonics Technology Letters, vol. 15, No. 5, May 2003, pp. 673-675.*
K.K.Y. Wong et al, "Polarization-Independent and flat-gain CW two-pump fiber optical parametric amplifier and wavelength convertoer", Technical Digest OFC 2002, paper TuS5.

* cited by examiner

*Primary Examiner*—John D. Lee

(57) ABSTRACT

A multi-pump phase modulator apparatus and operating method uses only one phase modulator to eliminate SBS without degrading idler(s). The single phase modulator phase modulates multiple pump signals to form multiple phase modulated pump signals using a modulation signal having a modulation period. A delay apparatus delays a first wavelength group by the modulation period relative to other wavelength groups. A combiner combines the delayed first wavelength group with the other wavelength groups to form a combined modulated multiple pump signal. In one embodiment a multi-pump phase parametric apparatus comprises the multi-pump phase modulator apparatus combined with a parametric apparatus to generate an amplified input signal and one or more idlers. Other embodiments of the multi-pump phase conjugator apparatus are used as part of an Optical Switch, Sampler, Tributary Extractor, and Regenerator.

19 Claims, 5 Drawing Sheets

INPUT SIGNAL S

PUMP MODULATION SIGNAL

MULTIPLE PUMP PARAMETRIC APPARATUS HAVING NO IDLER BROADENING

TECHNICAL FIELD OF THE INVENTION

This invention relates generally to multiple pump parametric apparatuses and, more particularly, to a multi-pump parametric apparatus having no idler signal broadening.

BACKGROUND OF THE INVENTION

Parametric processes in highly nonlinear fiber (HNLF) are used in parametric amplification, wavelength conversion, ultrafast optical sampling and multiple channel penalty mitigation. A unique characteristic of two-pump parametric interaction in HNLF enables multispectral switching, which is not attainable by conventional one-pump devices. While significant progress in advancing the art of parametric design has been made to date, a number of practical issues still need to be resolved. The occurrence of Brillouin scattering represents a chief obstacle towards higher parametric performance since it limits the usable pump powers, and consequently, the available parametric gain/efficiency. In parametric fiber applications requiring high continuous wave (cw) optical power, SBS (stimulated Brillouin scattering) must be suppressed. This is commonly accomplished by frequency modulation, digital phase modulation, or analog phase modulation of the cw light to suppress the carrier component and broaden the pump spectrum. Frequency modulation of the pump light is typically accomplished by repetitively dithering the frequency of the source laser. Digital phase modulation is accomplished by means of an external (separate device) phase modulator driven repetitively by an electronic signal such as a PRBS (pseudo-random bit stream), typically at fairly high data rates (>1 Gb/s). Analog phase modulation is accomplished by means of an external phase modulator driven repetitively by an electronic signal composed of multiple harmonics. While applications requiring high cw optical power use pump spectral broadening in order to increase the Brillouin threshold, in one-pump parametric architectures this causes excessive idler spectral broadening, which cause a fundamental impairment. This basic limitation can be, in principle, completely removed in the two-pump architecture by counter phasing the modulation of the pumps, when using PRBS or multiple-harmonic pump phase modulation or frequency modulation. In such an arrangement, when the phase of one pump is increased the phase of the other pump is decreased and vice versa, thereby maintaining a constant average pump optical frequency, a condition that eliminates idler broadening. For digital phase modulation, the two pumps are phase modulated by separate phase modulators driven synchronously by a PRBS sequence and its complementary sequence, PRBS bar, respectively, or by another suitable sequence together with its complementary sequence.

A fiber parametric amplifier is an example of an application requiring high cw power in which a high-power pump amplifies an input signal(s) and creates one or more idlers at new wavelengths. However employing phase modulation to broaden the pump spectrum in order to suppress SBS has the undesirable consequence that the idlers experience broadening. This can degrade the idlers in various transmission and filtering environments. In U.S. Pat. No. 5,386,314 a technique was disclosed to prevent idler broadening in fiber parametric amplifiers. This patent disclosed that the distortion effects resulting from pump modulation used to raise the SBS threshold can be eliminated by using the same modulation, but opposite in sign, on the two pump signals. As a result, the phase conjugate mixing product of the input signal and the two modulated pump beams will therefore not have the low frequency distortion which normally accompanies SBS suppression by pump modulation.

More recently, the article by S. Radic, C. J. McKinstrie, R. M. Jopson, J. C. Centanni, A. R. Chraplyvy, C. G. Jorgensen, K. Brar and C. Headley, "Selective Suppression of Idler Spectral Broadening in Two-Pump Parametric Architectures", IEEE Photon. Technol. Lett, V. 15, p673, May 1, 2003, discloses that while co-phased pump modulation allows the use of a single phase modulator, pump counter-phasing inherently requires two synchronized phase modulators. However, the electrooptic responses of two nominally identical high-speed phase modulators driven by nominally identical electronic amplifiers are never exactly the same. These differences in electronic and electrooptic responses can lead to degradation of the idler(s) because the pumps are not perfectly counter-phased.

Thus, there is a continuing need to reduce or eliminate SBS in fiber parametric applications to eliminate SBS without degrading idler(s).

SUMMARY OF THE INVENTION

In accordance with the apparatus and operating method of the present invention, a multi-pump phase modulator apparatus is disclosed that uses only one phase modulator to eliminate SBS without degrading the idler(s). Since only one phase modulator is used, the resulting modulation on the pumps is more easily made to be exactly opposite in sign and thus the phase distortion effects resulting from phase modulation used to raise the SBS threshold are more easily eliminated. More specifically in an embodiment of our invention, a multi-pump phase modulator apparatus comprises means for receiving multiple optical wavelength pump signals;

a single phase modulator for phase modulating the multiple pump signals to form phase modulated multiple pump signals using a modulation signal having a predetermined modulation period;

a wavelength selective signal splitter for separating the phase modulated multiple pump signals into at least two wavelength groups;

a delay apparatus for delaying a first wavelength group by the predetermined modulation period relative to other wavelength groups; and combiner for combining the delayed first wavelength group with the other wavelength groups to form a combined modulated multiple pump signal.

In another embodiment, a multi-pump phase parametric apparatus comprises means for receiving multiple optical wavelength pump signals;

a single phase modulator for phase modulating the multiple pump signals to form phase modulated multiple pump signals using a modulation signal having a predetermined modulation period;

a wavelength selective signal splitter for separating the phase modulated multiple pump signals into at least two wavelength groups;

a delay apparatus for delaying a first wavelength group by the predetermined modulation period relative to other wavelength groups;

a combiner for combining the delayed first wavelength group with the other wavelength groups to form a combined modulated multiple pump signal; and a parametric apparatus for receiving the combined modulated multiple pump signal and for amplifying an input signal S, and for outputting a signal selected from a group including an amplified input signal and one or more idlers generated by the parametric apparatus.

Other embodiments include the use of the multi-pump phase parametric apparatus as part of an Optical Switch, Sampler, Tributary Extractor, and Regenerator.

One feature of the invention is directed to a method of operating a parametric apparatus, comprising the steps of:

receiving multiple optical wavelength pump signals;

using a single phase modulator for phase modulating the multiple pump signals to form phase modulated multiple pump signals using a modulation signal having a predetermined modulation period, separating the phase modulated multiple pump signals into at least two wavelength groups;

delaying a first wavelength group by the predetermined modulation period relative to other wavelength groups; and combining the delayed first wavelength group with the other wavelength groups to form a combined modulated multiple pump signal.

BRIEF DESCRIPTION OF THE DRAWINGS

The present invention will be more fully appreciated by consideration of the following Detailed Description, which should be read in light of the accompanying drawing in which.

In the following description, identical element designations in different figures represent identical elements. Additionally in the element designations, the first digit refers to the figure in which that element is first located (e.g., 112 is first located in FIG. 1).

DETAILED DESCRIPTION

The present invention is directed to a multi-pump phase modulation apparatus using one phase modulator. A multi-pump parametric apparatus is formed by combining the multi-pump phase modulation apparatus with a parametric amplifier apparatus. Our multi-pump phase conjugator apparatus may be used with two or more pumps. However, for illustrative convenience only the two-pump and three-pump embodiments are described. It should be understood that embodiments using four or more pumps are a straightforward extension of the two-pump and three-pump embodiments described.

Two-Pump Embodiment

Initially, only the two-pump phase modulator and two-pump parametric apparatuses is described. Thus, in the following description of FIGS. 1–8 only the pump signals $P_1$ ($\lambda_1$) and $P_2$ ($\lambda_2$) and the associated circuits are described. Note in this description, the phrase "pump signal" is used interchangeably with the term "pump." The use of the third pump signal $P_3$ ($\lambda_3$) and the additional circuits required for the three-pump embodiment, as shown in FIGS. 3–6, will be discussed in the Three-Pump Embodiment section of the application.

Figure 1:
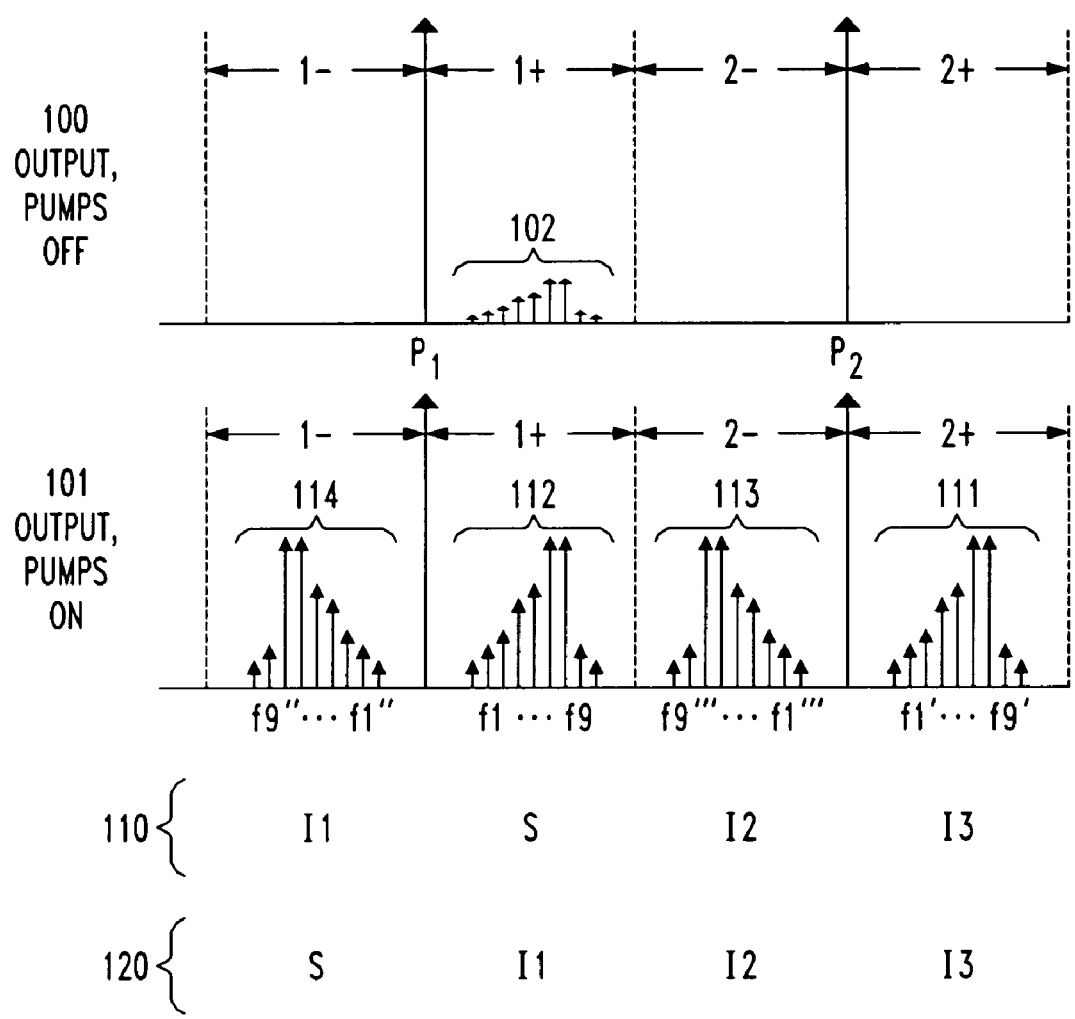
FIG. 1 illustrates the output waveforms of the various gain bands of a multi-pump parametric apparatus with the pumps on and off.

Shown in FIG. 1 are the outputs of a two-pump parametric apparatus having four primary bands 1−, 1+, 2−, 2+. The illustration 100 shows the resulting output signal 102 of a two-pump parametric apparatus in response to an input signal S while the pumps P1 and P2 are off. In such a state, since the pumps P1 and P2 are off there is no amplification by the two-pump parametric apparatus and output signal 102 is the input signal S attenuated by the loss in the two-pump parametric apparatus. The illustration 101 shows the output 112 when both of the pumps are on. As shown, when both pumps P1 and P2 are on, the input signal S (including one or more f1–f9) is amplified and additional idler signal bands I1–I3 are generated. In this example, the input signal S is assumed to be located in the band designated as 1+ and to include a plurality of frequencies f1–f9 at different amplitudes.

As shown, the output of a two-pump parametric apparatus has four primary bands including inner bands (1+ and 2−) and outer bands (1− and 2+). Inner bands are those bands (1+ and 2−) that are located between the two pump wavelengths and the outer bands (1− and 2+) are those that are not located between but are outside of the two pump wavelengths $P_1$ and $P_2$. Signal amplification of an input signal S is accompanied by the generation of two conjugated idlers and one non-conjugated idler. As shown by 110, when the signal S is in the inner-band 1+, it generates one conjugated idler I1 and one non-conjugated idler I3 in outer-band idlers 1− and 2+, respectively, and one conjugated idler I2 in the inner-band 2−. As shown by 120, when the signal S is in the outer-band 1−, it generates a conjugated idler I1 and a non-conjugated idler I2 in inner-band idlers 1+ and 2−, respectively, and one conjugated idler I3 in outer-band idler 2+. While the signal S is shown as including a plurality of wavelengths f1–f9, the signal S may more generally include one or more wavelengths. Note that when the input signal S is applied to the other bands 2− and 2+ it would produce similar output signal spectra when the pumps $P_1$ and $P_2$ are on.

As noted, the two-pump parametric apparatus produces phase conjugate replicas of the input signal or non-conjugated replicas of the input signal. As shown by 110 and 120, depending in which band the input signal S is located different one(s) of the idlers I1, I2, I3 will be conjugated or non-conjugated relative to input signal S. Consequently, the output from the two-pump parametric apparatus can be selected to be the signal S or one of the idler signals I1, I2, I3, thus the output signal can be a mirrored version (wavelength shifted and conjugated) or translated version (wavelength shifted and non-conjugated) of the signal spectrum S.

The table below summarizes the idler phasing in different output bands for an input signal S in different bands. As shown the first column indicates the input band, the second column the output signal band, and the third column the idler phasing. The first row shows an input band 1−, when the input signal S has a frequency below the frequency of pump signal P1. The input band 1+ is when the input signal S has a frequency above that of pump signal P1 but below the mean of the frequencies of pump signals P1 and P2. The input band 2− is when the input signal S has a frequency above the mean of the frequencies of pump signal P1 and P2 and below that of pump signal P2. Finally, the input band 2+ is when the input signal S has a frequency above that of pump signal P2. The different row entries in the table below show for a given input signal S band, which output band should be used to obtain an output signal that is either a non-conjugate or a conjugate to the input signal S.

| Input S band | Output band | Idler phasing |
| --- | --- | --- |
| 1− | 1+ | conjugate |
| 1− | 2− | non-conjugate |
| 1− | 2+ | conjugate |
| 1+ | 1− | conjugate |
| 1+ | 2− | conjugate |
| 1+ | 2+ | non-conjugate |
| and similarly: | | |
| 2− | 2+ | conjugate |
| 2− | 1+ | conjugate |
| 2− | 1− | non-conjugate |
| 2+ | 2− | conjugate |
| 2+ | 1+ | non-conjugate |
| 2+ | 1− | conjugate |

With reference to the example 110, if the input signal S is in band 1+, the resulting three idler bands are I1, I2, and I3. As shown, idler I3 is a non-conjugate signal 111 in band 2+ and idlers I1 and I2 are conjugate signals obtained in bands 1− and 2−, respectively. Thus non-conjugate idler 111 has signals f1′–f9′ which have the same relative wavelength amplitude distribution f1′–f9′ as the input signal S, while conjugate idlers I1 and I2 have the reverse spectral distributions, f1″–f9″ and f1‴–f9‴ respectively, as the input signal S. Thus with reference to 110, for an input signal S in band 1+, if a non-conjugate output signal is desired then the idler signal I3 in band 2+ is selected as the output signal and if a conjugate output signal is desired then either idler signal I1 or I3 in bands 1− and 2−, respectively, is selected. As shown, when the output signal, e.g., I3, is a non-conjugate replica of the input signal, S, the wavelength amplitude distribution 112 (f1–f9) of the input signal S and the spectral distribution 111 (f1′–f9′) of the output signal, I3 vary in the same manner. When the output signal, e.g., I2, is a conjugate replica of the input signal, S, the spectral distribution 112 (f1–f9) of the input signal S and output signal I2. i.e., 113, vary in the reverse manner.

With reference to the example 120, when the input signal S is in band 1− the resulting three idler bands are I1, I2, and I3 are located, respectively, in bands 1+, 2−, and 2+. Thus, when the input signal S is in band 1−, a non-conjugate output signal 113 can be obtained using idler I2 in band 2− and conjugate output signal can be obtained using idler I1 or idler I3 in bands 1+ and 2+, respectively.

Under ideal conditions as shown by examples 110 and 120 of FIG. 1, the idler spectra I1, I2, I3 are mirrored or translated replicas of the signal spectrum S. In practice however, the pump-phase modulation, which is required to increase the Brillouin threshold, necessarily broadens the idler spectra. Asynchronous pump-phase modulation results in excessive spectral broadening of all three idler waves. It was shown in the U.S. Pat. No. 5,386,314 that counter-phased pump modulation can be used to generate an unimpaired idler wave: the inner-band signal generates an unimpaired inner-band idler, whereas the outer-band signal generates an unimpaired outer-band idler. Co-phased pump modulation was used in the previously referenced Radic et al. article to demonstrate unimpaired idler generation in the outer (inner) band when the signal occupies the inner (outer) band.

Figure 2:
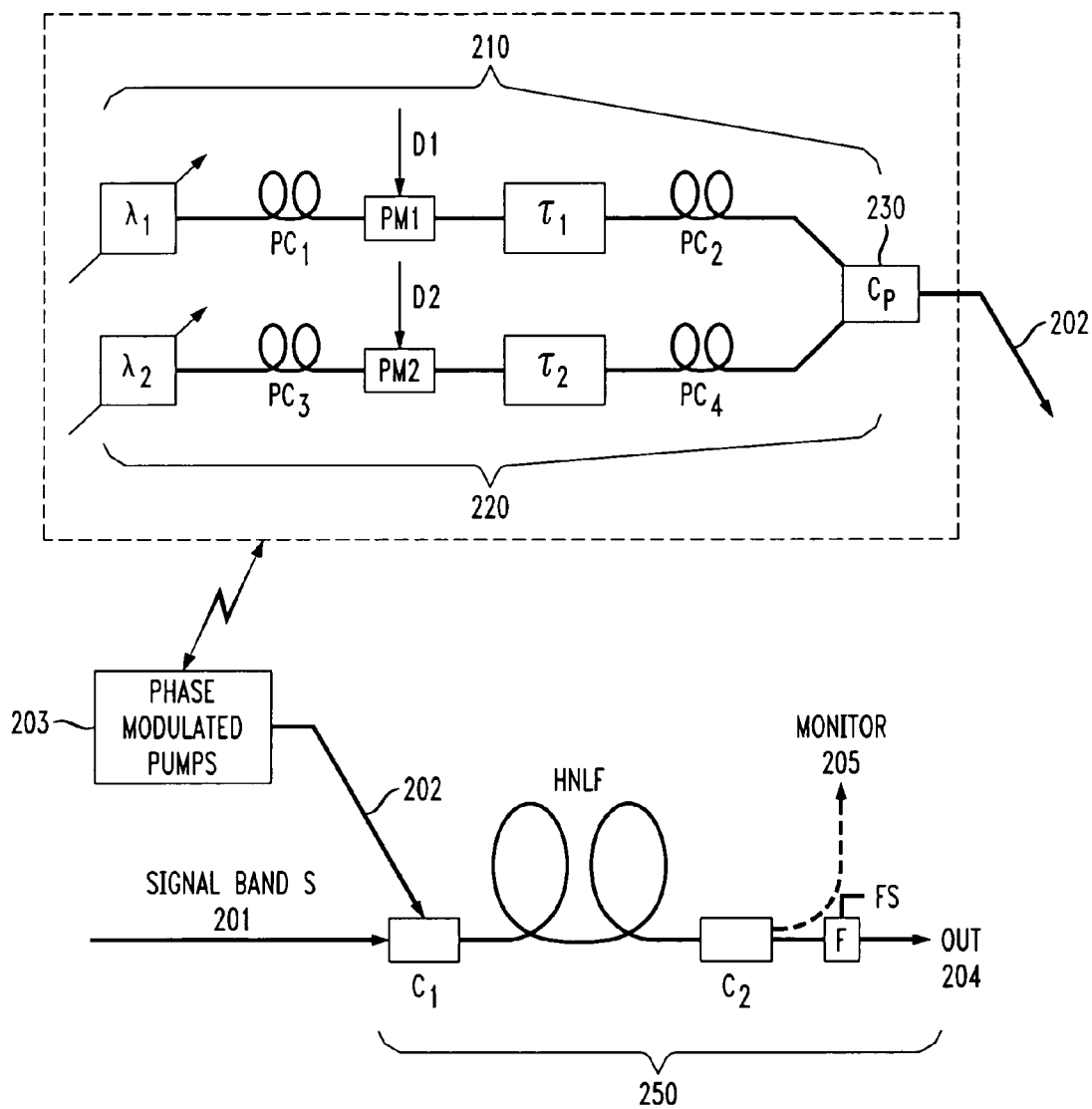
FIG. 2 illustrates the prior art generalized two-pump parametric apparatus that includes co- and counter-phased pump modulation.

Shown in FIG. 2 is an illustration of the prior art generalized two-pump parametric apparatus described in the previously referenced Radic et al. article that allows both co- and counter-phased pump modulation. As shown, an input signal band 201 is coupled together with the combined phased modulated pump signal 202 from phase modulation circuit 203 to parametric apparatus 250 via coupler C1. The parametric apparatus 250 includes coupler C1, a parametric amplifier formed from a highly nonlinear fiber (HNLF), a bandsplitter coupler C2, and an optional wavelength selective filter F. The signal from the HNLF is split, by coupler C2, into an output signal 204 (which is optionally filtered by filter F) and monitor signal 205. The control signal FS is used to control filter F to select the desired wavelength band (1−, 1+, 2−, or 2+) of the output signal OUT, 204.

Phase modulation circuit 203 includes two phase modulated sources 210 and 220 with nearly identical responses whose output signals are combined in coupler $C_P$, 230, and become the counter-phased modulated pump signals 202. The phase modulated source 210 includes a pump signal $\lambda_1$ coupled via a polarization controller $PC_1$ to a phase modulator PM1 that is modulated by a waveform $D_1$. The output of phase modulator PM1 is delayed in delay circuit $\tau_1$ and coupled via polarization controller $PC_2$ to coupler 230. Phase modulated source 220 is similar to phase modulator 210 and includes a pump signal $\lambda_2$ coupled via a polarization controller $PC_2$ to a phase modulator PM2 that is modulated by a waveform $D_2$. Ideally, phase modulator PM2 is identical to PM1. Note that the polarization of pumps $\lambda_1$ and $\lambda_2$ are maintained orthogonal.

The waveform $D_2$ is either an identical or complementary waveform to waveform $D_1$. The output of phase modulator PM2 is delayed in delay circuit $\tau_2$ and coupled via polarization controller $PC_4$ to coupler 230. The two-pump parametric apparatus of FIG. 2 thus allows arbitrary; unimpaired idler generation using two phase modulators 210 and 220 driven by either identical or complementary waveforms $D_1$ and $D_2$. The delay circuits $\tau_1$ and $\tau_2$ are adjusted to synchronize the operation of phase modulators 210 and 220.

Undesirably, the synchronized pump modulation technique of FIG. 2 requires precise path balancing and the two phase modulators in 210 and 220 should have nearly identical responses. The latter requirement can be, in principle, circumvented for co-phased operation, by pumping using only one phase modulator; however, chromatic dispersion in various components may prevent precisely co-phased operation. Unfortunately, counter-phased operation still requires two separate modulator devices having nearly identical responses.

Figure 3:
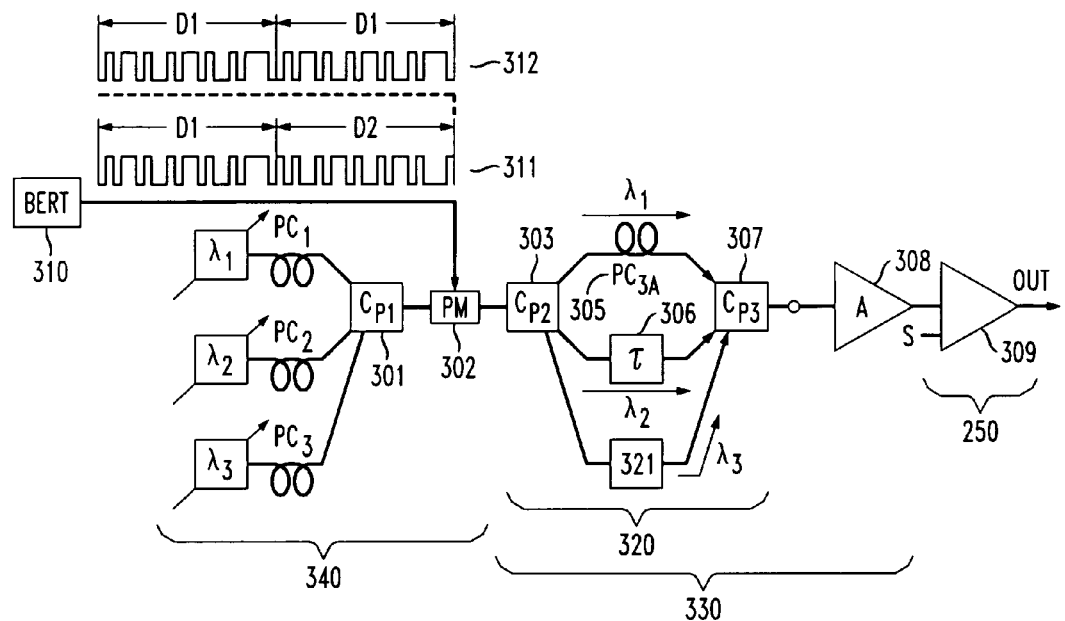
FIG. 3 illustrates a first embodiment of our multi-pump parametric apparatus including a delay-and-match pump-phase modulation apparatus using one phase modulator.

FIG. 3 illustrates our novel multi-pump parametric apparatus (including our novel two-pump phase modulator apparatus), which uses a delay-and-match pump-phase modulation technique implemented using a single phase modulator. Since only one phase modulator is used, the phase distortion effects resulting from phase modulation used to raise the SBS threshold is more easily eliminated by using the same modulation, but opposite in sign, on the two pump signals $\lambda_1$ and $\lambda_2$. As shown, the two-pump phase modulator apparatus includes a phase modulated source 340, a delay-and-match unit 330, and a parametric apparatus (amplifier) 250. The use of a single phase modulator 302 overcomes the precise path balancing needed by the prior art arrangement shown in FIG. 2, which required a separate phase modulator for both co-phased and counter-phased pump modulation. It also eliminates the requirement of having two phase modulators with nearly identical responses. As shown, two pump signals $\lambda_1$ and $\lambda_2$ are coupled via polarization controllers $PC_1$ and $PC_2$ and added in combiner coupler ($C_{p1}$), 301. It should be noted that polarization maintaining fiber may be substituted for the polarization controllers $PC_1$ and $PC_2$. Furthermore, the operation of our novel multi-pump parametric apparatus (including our novel two-pump phase modulator apparatus) does not require two pump signals, e.g., $\lambda_1$ and $\lambda_2$, which are orthogonally polarized. They may be copolarized or have some other polarization relationship, such as random.

The combined pump signal is modulated by a phase modulator (PM), 302 driven using a periodic electrical waveform D1D2, corresponding to a predetermined phase pattern to be impressed on both pump signals ($\lambda_1$ and $\lambda_2$). Illustratively, a BERT (bit error rate test set) 310 is used to generate the predetermined phase patterns D1 and D2, which may be pseudo random bit sequences (PRBSs). The BERT 310 may be implemented in a well-known manner using shift registers. Such a BERT is available in various $2^N-1$ bit sizes, where N is 7, 10, 15, 23, etc. Since delay element 306 is typically implemented using a length of fibers N is selected by determining the practical length of the fiber needed to implement the delay element 306, considering as well the desired spectral characteristics of the modulated pump signals. It should be noted that while our two pump phase conjugator apparatus preferably uses predetermined phase patterns D1 and D2 which use a digital PRBS signal, in other embodiments non-PRBS digital signals or analog signals may be used.

The periodic electrical waveform subpatterns (D1, D2) identical durations ($\tau_{D1}=\tau_{D2}=\tau_{D1D2}/2$). The modulated pump signal Output of phase modulator 302 is demultiplexed by bandsplitting element ($C_{P2}$), 303, into a modulated $\lambda_1$ signal and a modulated $\lambda_2$ signal.

The modulated $\lambda_1$ signal is passed through polarization controller $PC_{3A}$, 305 which can be used to achieve a desired polarization relationship between the modulated $\lambda_1$ and $\lambda_2$ signals. The modulated 2 signal is passed through a delay element, 306, that delays the signal by time $\tau$. As will be discussed in a later paragraph, the $\tau$ delay element 306 is chosen to match the duration of the modulation subpattern: $\tau=\tau_{D1}=\tau_{D2}=\tau_{D1D2}/2$. The $\tau$ delay element 306 may be implemented using a length of single mode fiber (SMF).

The delayed modulated $\lambda_1$ and $\lambda_2$ pump signals are combined into a modulated multiple pump signal by combiner coupler ($C_{P3}$), 307 prior to insertion into amplifier 308 that amplifies the combined signal. The output of amplifier 308 is coupled to parametric apparatus 250. As previously discussed in FIG. 2, parametric apparatus 250 typically contains a highly nonlinear fiber (HNLF), but may also be implemented using any nonlinear optical element. Parametric apparatus 250 also receives an input signal S along with the combined modulated $\lambda_1$ and $\lambda_2$ pump signals and generates output signal OUT. When the input signal S is applied to parametric apparatus 250, when neither of the pumps $\lambda_1$ and $\lambda_2$ is present, the output signal OUT will be an attenuated version 102 of the input signal S with no idlers I1–I3 (as shown in 100 in FIG. 1). However with reference to FIG. 1 when both of the pumps $\lambda_1$ and $\lambda_2$ are present, 110, and the input signal S is applied to parametric apparatus 250, its output filter F can be used to select the wavelength band of the output signal OUT to be an amplified version 112 of the input signal S or any of the idlers I1–I3 shown illustratively as 114, 113, and 111. As discussed previously with reference to FIG. 1, the selection of a particular output signal OUT from the wavelength bands (1−, 1+, 2−, 2+) is dependent on whether the output signal OUT is to be a mirrored or translated version of the input signal spectrum S. In this example, the selected output signal OUT from parametric apparatus 250 is one that has eliminated SBS without degrading the idler signals I1–I3.

The co- or counter-phased pump scheme used in FIG. 3, is realized by using a simple choice of pattern: D1=D2 (co-phasing) as shown by 312 or D1=$\overline{D2}$ (counter-phasing) as shown by 311. Illustratively, the modulation subpattern may be a PRBS sequence formed into words D1 and D2 of a predetermined number of bits. The D1 word is a PRBS sequence and the D2 word is a complementary PRBS bar ($\overline{PRBS}$) sequence. The sequence of alternating words D1 and D2 (311 when D1=$\overline{D2}$ and 312 when D1=D2) are input to the phase modulator 302.

The $\tau$ optical delay 306 introduced to the modulated $\lambda_2$ pump signal after it is demultiplexed by element $C_{P2}$, 303, is ideally exactly the length of time of the D1 or D2 sequence (also referred to as the modulation period). Thus the $\tau$ delay of element 306 is the flight or travel time (nL/c) that corresponds to the length, L, of the fiber section used to implement the $\tau$ delay and ideally equals the duration of the modulation subpattern ($\tau_{D1}=\tau_{D2}$). Here, c/n is the group velocity in the fiber of signals having wavelength $\lambda_2$. The co- and counter-phased pump modulation corresponds to complementary (D1=$\overline{D2}$) and concatenated (D1=D2) waveforms. Specifically, both schemes use a $2^N-1$ bit long PRBS word generated by the pattern generator: the complementary scheme repeats the PRBS word and its complement, whereas the concatenated scheme simply repeats the PRBS word. The physical length L of the fiber delay ($\tau$) is determined by the duration of the PRBS word:

$$L=(2^N-1) \times c/nf,$$

where N is the PRBS order, c/n is the group velocity of the delayed pump ($\lambda_2$) and f is the phase modulation frequency. In accordance with one aspect of the present invention, rather than precisely adjusting the length of the fiber used in the $\tau$ optical delay 306 in order to match the pattern length and pump group velocity, the required optical delay 306 is adjusted or preset to within about 1 cm (equivalent to about 50 ps delay). The exact delay is then achieved by tuning (or adjusting) the phase modulation frequency, f, (bit rate) of the BERT pattern generator 310. This procedure allows for a large length error (~cm) in the length of the fiber used for the $\tau$ optical delay 306 to be compensated by a small frequency detuning, even for a short PRBS length (N=7): 10 GHz pump modulation requires approximately +/−40 MHz adjustment for each centimeter of the fiber delay mismatch. More importantly, this method does not require precise knowledge of the delayed pump group velocity.

When a counter-phased pump scheme is utilized (i.e., D1=$\overline{D2}$), the $\tau$ optical delay 306 is set (and, if utilized, BERT pattern generator 310 may be adjusted) to cause the D2 modulated $\lambda_1$ signal to arrive at combiner 307 at the same time as the D1 modulated $\lambda_2$ signal. Thus, the modulation of the $\lambda_1$ signal is the complement of the modulation of the $\lambda_2$ signal. The net result is that the two modulated $\lambda_1$ and $\lambda_2$ pump signals enter the parametric amplifier 309 exactly counter-phased (i.e., when $\lambda_1$ is modulated with D1, $\lambda_2$ is modulated with D2 and vice-versa) and, because the modulated $\lambda_1$ and $\lambda_2$ pump signals were both modulated with the same modulator/drive electronics 302, there is no mismatch between the modulated $\lambda_1$ and $\lambda_2$ pump signals due to different frequency responses of electronic/electrooptic elements of the FIG. 3 apparatus. Because of the complementary modulation of the $\lambda_1$ and $\lambda_2$ pump signals (i.e., D1=$\overline{D2}$), the result is that when the phase of the modulated $\lambda_1$ pump is increased, the phase of the other modulated $\lambda_2$ pump is decreased and vice versa, thereby maintaining a constant average optical pump frequency, a condition that eliminates idler broadening. Consequently, the effect of SBS on the output signal OUT has been eliminated or reduced and there is no degradation in the idler signals.

While the present invention has been described as using a digital signal pattern D1, D2 for modulation of the pump signals, it should be understood that an analog signal may be used as the modulation signal. One such analog modulation signal containing four frequencies has been described in the article entitled "529 km unrepeatered transmission at 2.488 GBit/s using dispersion compensation, forward error correction, and remote post- and pre-amplifiers pumped by diode-pumped Raman lasers," by P. B. Hansen; L. Eskilden, S. G. Grubb, A. M. Vengsarkar, S. K. Korotky, T. A. Strasser, J. E. J. Alphonsus, J. J. Veselka, D. J. DiGiovanni, D. W. Peckham, E. C. Beck, D. Truxal, W. Y. Cheung, S. G. Kosinski, D. Gasper, P. F. Wysocki, V. L. da Silva. J. B. Simpson, Electronics Letters, Vol. 31, Iss.17, 17 Aug. 1995 Pages:1460–1461. In one embodiment, these frequencies are spaced roughly by factors of three, for instance, 50 MHz, 150 MHz, 450 MHz, and 1350 MHz and their amplitude is adjusted so that the optical power after the phase modulator in each of the two phase modulation optical sidebands closest to the carrier is equal to the power in the carrier. In one embodiment the exact frequencies could be chosen to provide counter-phased pump modulation or co-phased pump modulation, as required.

The elimination of idler broadening depends on the alignment of the pump modulations at a point within the parametric amplifier, typically at the HNLF. For some embodiments, this alignment may differ from having the pump modulations aligned at combiner coupler ($C_{P3}$), 307 as discussed in preceding paragraphs. Such difference may arise from the presence of chromatic dispersion, especially if the pumps are amplified or from additional splitting of the paths of the pumps. Where such difference exists, pump modulation can be aligned at any desired point by suitable choice of the length of the fiber used in the $\tau$ optical delay, 306, and the phase modulation frequency, f, (bit rate) of the BERT pattern generator 310.

However, changing a pump wavelength will shift the point at which the pump modulations are aligned. This is caused by chromatic dispersion between that point and phase modulator 302. For example, if the apparatus contains 50 meters of standard single mode fiber with a chromatic dispersion of 16 ps/nm, the pump modulation alignment $\lambda_1$ change by 0.8 ps for every nanometer of change in the wavelength of one of the pumps, $\lambda_1$ or $\lambda_2$. This dispersion also causes distortion in the phase modulation imposed on the pumps. Both problems can be mitigated by dispersion compensation. Dispersion compensation is most conveniently provided by dispersion compensating fiber, but other means for compensating dispersion are well known. To completely eliminate distortion caused by chromatic dispersion, each pump should be compensated to provide a net dispersion of zero between the modulator and the desired point of alignment. This can be accomplished by separately compensating each pump in the paths between bandsplitting element 303 and combiner coupler 307 where it is demultiplexed from the other pumps. However, it will generally be more economical to provide most of the dispersion compensation in places such as between combiner 307 and amplifier 308, where the pumps are combined. If this compensation does not suffice small additional adjustments to the compensation can be made separately for each pump in the paths between bandsplitting element 303 and combiner coupler 307 or other paths where the pumps are demultiplexed. For very short pump modulation pattern lengths, the differential delay itself can be provided by dispersion compensation, eliminating the necessity of separately demultiplexing and remultiplexing the pumps.

Figure 4:
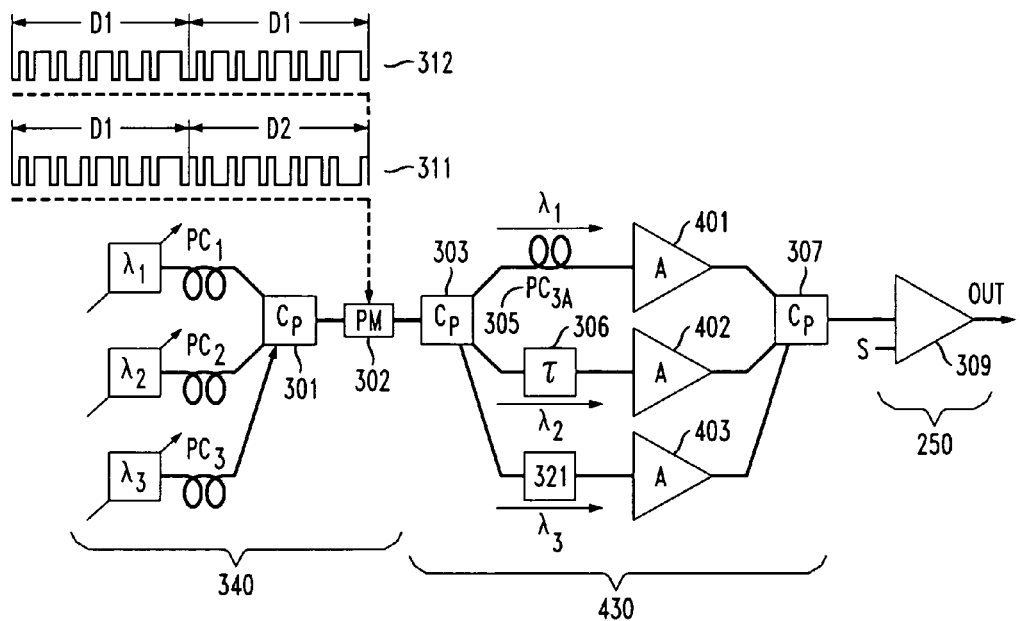
FIG. 4. illustrates a second embodiment of the multi-pump parametric apparatus having a separate amplifier for each pump signal.

FIG. 4 illustrates a second embodiment of the present invention using a separate amplifier for each pump signal. Thus for the two pump signal arrangement, two amplifiers 401 and 402 replace the one common amplifier 308 used in FIG. 3. A two amplifier arrangement is desirable when no single amplifier can cover both pump frequencies or when one amplifier provides insufficent optical power. The total pump power can be twice as large when two amps are used, if combiner 307 is frequency selective.

Amplifier 401 amplifies the modulated $\lambda_1$ pump signal and amplifier 402 amplifies the modulated $\lambda_2$ pump signal. In this arrangement, delay 306 is set to correct for differential delays such as the relative pump phasing (between $\lambda_1$ and $\lambda_2$) caused by the phase modulation pattern used, fiber chromatic dispersion, and path length differences in section 430 (including delay differences between amplifiers 401 and 402). In FIG. 4, the output of combiner 307 is coupled to parametric apparatus 250.

As was described for FIG. 3, delay element 306 is set to match the duration of the modulation subpattern: $\tau=\tau_{D1}=\tau_{D2}=\tau_{D1D2}/2$ or an odd integer multiple thereof at some point in the apparatus, often at a point within the parametric amplifier, such as the input to the HNLF. FIG. 4 can also be used for either co- or counter-phased pump scheme by a simple choice of pattern: D1=$\overline{D2}$ (co-phasing) as shown by 312 or D1=$\overline{D2}$ (counter-phasing) as shown by 311.

Figure 5:
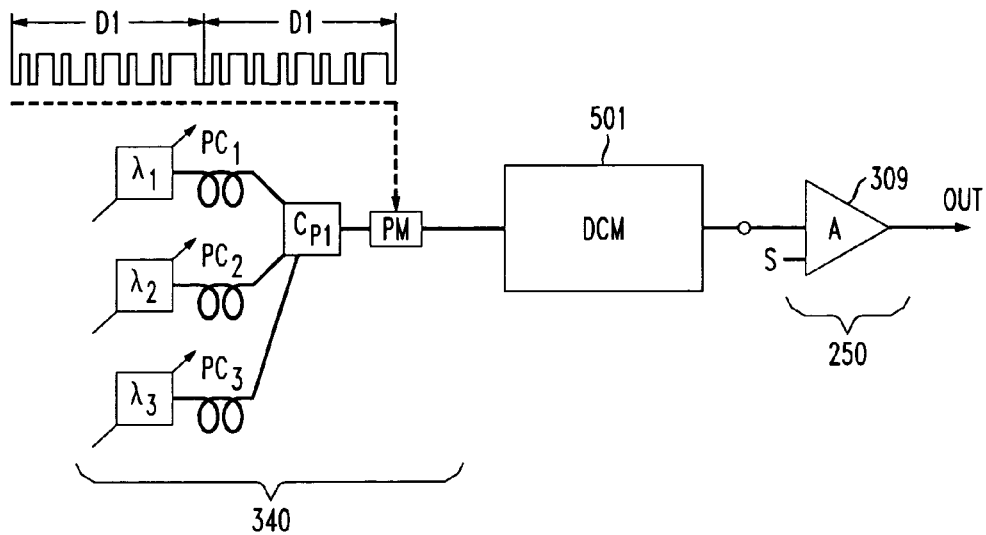
FIG. 5 illustrates a third embodiment of the multi-pump parametric apparatus using a dispersion compensation module.

FIG. 5 illustrates a third embodiment of the multi-pump phase conjugator that utilizes a dispersion compensation module (DCM) 501. In FIG. 5, chromatic dispersion is corrected by using a DCM 501, which may be implemented using dispersion compensating fiber. Such a phase conjugator may be used to reverse some or all the effects of chromatic dispersion and/or optical nonlinear effects in the multi-pump phase conjugator. The DCM 501 would include all of the elements shown in 330 of FIG. 3 in addition to a coil of dispersion compensating fiber utilized in both of the paths that the wavelengths $\lambda_1$ and $\lambda_2$ travel. Thus in FIGS. 3 and 4, the DCM 501 capability is provided by adding dispersion compensating fiber in one or more locations, such as in the path between PM 302 and splitter 303, in each path from splitter $C_P$, 303, in each path to amplifiers 308, 401 and 402, or in the path from combiner 307. Note that DCM 501 can be used to allow changes in the pump wavelengths $\lambda_1$ and $\lambda_2$. More specifically, DCM 501 can be added to the FIGS. 3 and 4 embodiments so that the required delay will not be affected by equal and opposite changes in the pump wavelengths. Equal and opposite changes in pump wavelengths are nearly exactly what is needed to tune the pump wavelengths $\lambda_1$ and $\lambda_2$ when the parametric apparatus 309 is composed of fiber. One skilled in the art will appreciate that the DCM 501 can be designed to correct the phasing when pump tuning requires changes in the pump wavelengths $\lambda_1$ and $\lambda_2$ that are not exactly equal and opposite. It will also be appreciated that the fiber that provides the actual dispersion compensation for DCM 501 can be placed anywhere between the modulator 302 and the parametric apparatus 308.

Figure 6:
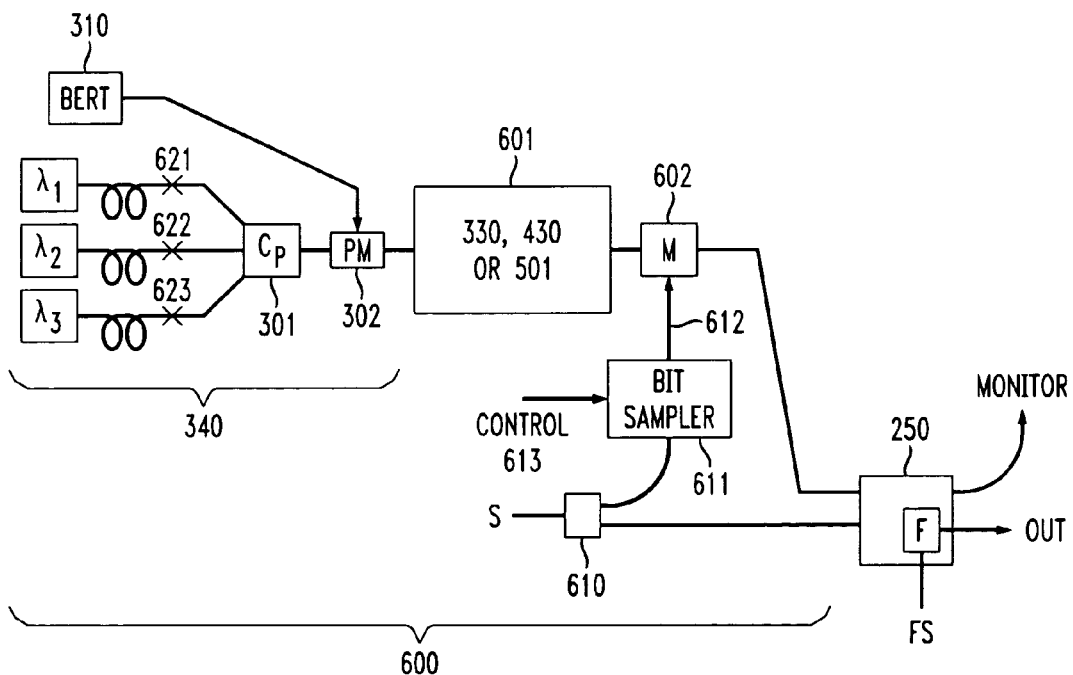
FIG. 6 illustrates a generalized embodiment of the multi-pump parametric apparatus that may be used for the Optical Switch, Sampler, Tributary Extractor, and Regenerator embodiments of our invention.

FIG. 6 illustrates a generalized embodiment of the multi-pump modulation apparatus 600 that is useful in explaining other operating functions that can be performed by our invention. As shown, the two-pump modulation apparatus 600 includes a single phase modulator unit 340, a dispersion compensating unit 601, and an intensity or amplitude modulator 602. The addition of the parametric apparatus 250 to the two-pump modulation apparatus 600 forms a two-pump parametric apparatus. The single phase modulator unit 340 and parametric apparatus 250 operate in the previously discussed manner. The dispersion compensating unit 601 may be implemented using the previously discussed apparatuses 330, 430, and 501.

The two-pump phase conjugator apparatus 600 shown in FIG. 6 may be utilized as a Switch by using pump amplitude control circuits for turning the pumps P1 and P2 on or off (e.g., via switches 621 and 622) or alternatively, by turning the Pump Intensity Modulation Signal 612 on or off. The control signal FS of wavelength selective filter F is then used to select the output band (1−, 1+, 2−, or 2+) of output signal OUT. If both pumps P1 and P2 are off and the output band is set to the same wavelength band as the input signal band, as shown in 100, the output OUT is an attenuated or residual input signal 102 of FIG. 1. However, as shown in 100, if both pumps P1 and P2 are off and the output band is set to a different wavelength band than the input signal band, the output OUT signal Would be zero. If both pumps P1 and P2 are on and the output band is set to the same wavelength band as the input signal band, as shown in 101, the output OUT is the amplified input signal 112 of FIG. 1. And if both pumps P1 and P2 are on and the output band is set to a different wavelength band as the input signal band, the output OUT is an amplified and wavelength shifted duplicate of input signal 112 (e.g., 111) or a wavelength shifted conjugate version (e.g., 114 or 113).

The two-pump phase conjugator apparatus 600 shown in FIG. 6 also may be utilized as a Sampler circuit with both pumps P1 and P2 on. In Such an arrangement coupler C2 of parametric apparatus 250 in FIG. 2 is a bandsplitter that is used to select a signal band to be used as the sample (Monitor) signal. The Monitor signal is a wavelength-shifted copy of the output signal OUT. The sample or Monitor signal may be selected to be a non-conjugated version or a conjugated version of the output signal OUT, depending on the wavelength band selected. In either case, The Monitor signal provides a sample of the signal passing through the parametric apparatus 250.

In another embodiment, the two-pump phase conjugator apparatus 600 also may be utilized as a Tributary Extractor with both pumps P1 and P2 on. The Tributary Extractor is used to extract every $n^{th}$ bit of a binary input signal S as the output signal OUT. The Tributary Extractor includes a Pump Intensity Modulator 602 that uses Pump Intensity Modulation Signal 612 to modulate the intensity of the combined modulated two-pump signal from the dispersion compensating unit 601. The bit sampler circuit 611 is used to sample the input signal S to recover the clock of the input signal S in order to generate a Pump Intensity Modulation Signal 612 with a pulse every n bits. The bit sampler circuit 611 is controlled by control signal 613 to select which bit is to be extracted by the Tributary Extractor. The bit sampler circuit 611 may be implemented as an opto-electronic circuit. In this Tributary Extractor, if desired, the coupler C2 may be used to sample the extracted output signal OUT as a Monitor signal.

Figure 7:
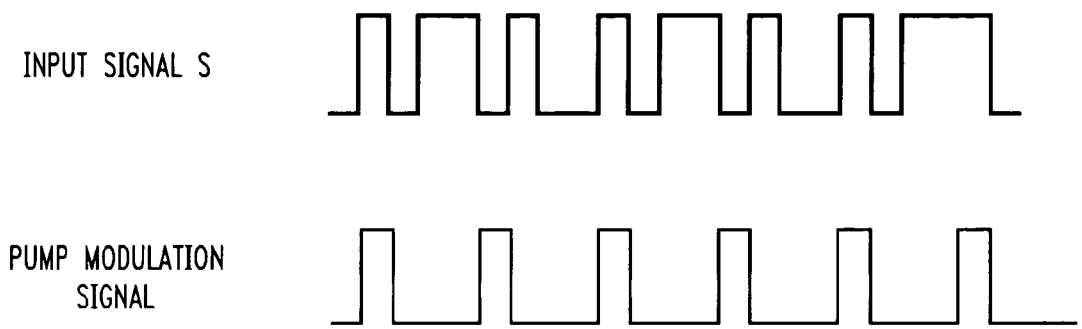
FIG. 7 shows an illustrative pump modulation signal used in the Tributary Extractor.

Illustratively, if n=4, the Pump Intensity Modulation Signal 612 is turned on every $4^{th}$ bit of the input signal S as shown in FIG. 7. The Pump Intensity Modulation Signal 612 enables the parametric apparatus 250 to use the pumps P1 and P2 to amplify every $1^{th}$ bit of the input signal S that becomes the output signal OUT. Again the band of the output signal OUT is selected by filter F. Note that if the input signal S contains a multitude of input signal wavelengths f1–f9 (as shown by 112 in FIG. 1), they must have the same clock phase to enable simultaneous Tributary Extraction of all the wavelengths, for example, f1–f9.

Figure 8:
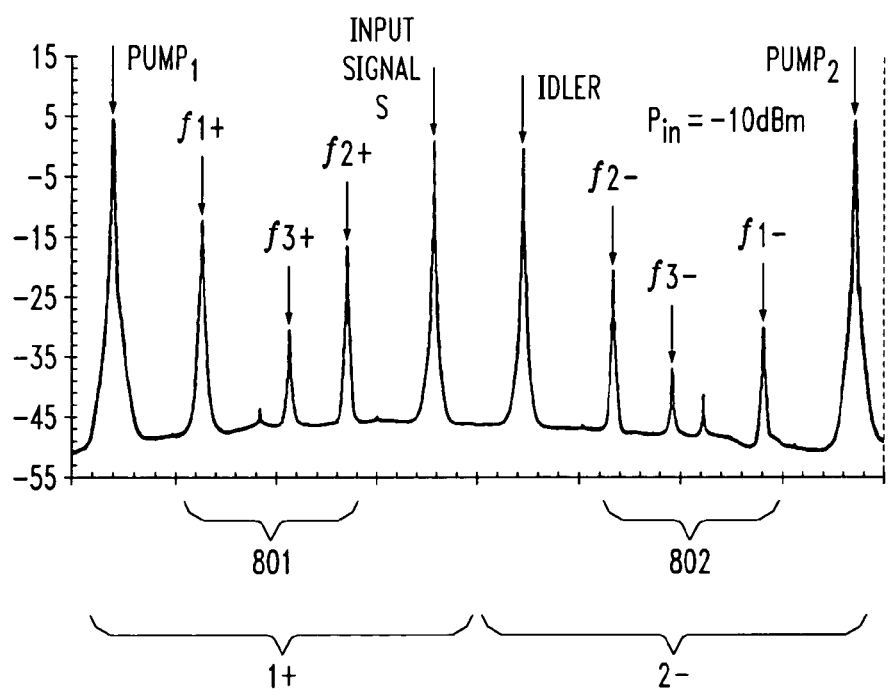
FIG. 8 shows an example of the output spectrum for a regenerator having a single wavelength input signal.

In yet another embodiment, the two-pump phase conjugator apparatus shown in FIG. 6 also may be utilized as a regenerator. A regenerator generally uses a single wavelength (e.g., f9 of 112 of FIG. 1) as the input signal S. The output signal OUT of the regenerator has additional wavelengths 801 and 802 which are not shown in FIG. 1. Additional wavelengths can arise from higher-order mixing between, for example, the signal squared and a pump. An example output signal OUT spectrum is shown in FIG. 8 where only the 1+ and 2− bands are shown. The output filter F is tuned to pass the signals useful for regeneration such as f2+ or f3+. Note, the amplitude of f2+ has to be high enough to provide a good signal to noise ratio, so that the output signal spectrum is a regeneration of the spectrum of the input signal S. The ideal transfer function of output signal spectrum vs, input signal spectrum is a stair step halfway between a zero and a one. In this case, the output signal is zero for inputs between 0 and ½ and the output signal is I for input powers greater than ½.

Three-Pump Embodiment

With reference to FIGS. 3–6 the use of the third pump signal $P_3$ ($\lambda_3$) and the additional circuits required for the three-pump embodiment are discussed. Note that the output waveforms of the various gain bands for the three-pump embodiment has not been illustrated in FIG. 1, since the output spectrum will be more complicated than that shown in FIG. 1. The use of more than 2 pumps can provide additional flexibility in the choice of an output frequency for a given input signal frequency. For instance, referring to FIG. 1, P1 and P2 acting on signal S in 110 will generate I3. With a suitable dispersion curve in the HNLF shown in FIG. 2 and suitable polarizations, a simultaneous third pump P3, acting on I3 could generate a conjugate to idler I3 at a frequency out of the range shown in FIG. 1. To avoid excessive broadening of the resulting conjugate, the phase modulation of P1, P2, and P3 must be chosen appropriately, in this case, the modulation of P3 and P2 should be co-phased and that of P1 should be counter-phased to them. With reference to FIG. 3, the three-pump phase conjugator apparatus includes a single phase modulator unit 340 (with the additional third pump signal $P_3$ ($\lambda_3$), polarization controller $PC_3$ and a delay-and-match unit 330 (with the additional circuit 321). It should be noted that with three wavelengths $\lambda1$–$\lambda3$ and only two phase states (co- and counter-phase), at least two wavelengths must always be co- or counter-phased. Of course, all three wavelengths can be co-phased. The additional circuit 321 may include a delay equivalent to that of $PC_3$, if $\lambda_1$ and $\lambda_3$ are to be co-phase signals and $\lambda_2$ a counter-phase signal. Thus, the operation of three-pump phase conjugator apparatus for wavelength $\lambda_3$ is the same as that previously described for wavelength $\lambda_1$.

Alternatively, the additional circuit 321 may be a circuit with a delay equal to $\tau$ if $\lambda_3$ and $\lambda_2$ are to be co-phase signals and $\lambda_1$ a counter-phase signal. In this case, the operation of three-pump phase conjugator apparatus for $\lambda_3$ will be the same as that previously described for $\lambda_2$. Note that when $\lambda_1$ and $\lambda_2$ are co-phased, the bandsplitter coupler $CP_2$ can be made to split both $\lambda_1$ and $\lambda_2$ from $\lambda_3$, so that both $\lambda_1$ and $\lambda_2$ would be processed by the same circuit of 320 that previously processed only $\lambda_1$. In this manner, the additional separate $\lambda_2$ circuits 321 would not have to be added. Similary, if $\lambda_3$ and $\lambda_2$ are co-phased, the bandsplitter coupler $CP_2$ can be made to split both $\lambda_2$ and $\lambda_3$ from $\lambda_1$, so that both $\lambda_2$ and $\lambda_3$ would be processed by the circuit 306 of 320 that previously processed only $\lambda_2$. In either of these two cases, the additional separate $\lambda_3$ circuits 321 would not have to be added.

The three-pump phase conjugator apparatus shown in FIG. 4 is basically the same as the three-pump phase conjugator apparatus shown in FIG. 3, except that unit 430 replaces unit 330. In unit 430 of FIG. 4, the wavelength $\lambda_3$ path also has an amplifier 403 which amplifies in the same manner as amplifiers 401 and 402. Again the three-pump phase conjugator apparatus of FIG. 4 operates in essentially the same manner for $\lambda_3$ as that described above for the three-pump phase conjugator apparatus of FIG. 3 with a wavelength $\lambda_3$. Thus, the operation will depend on whether $\lambda_3$ is co-phased or counter-phased to $\lambda_1$ and $\lambda_2$, respectively.

The three-pump phase conjugator apparatus shown in FIG. 5 also includes the additional third pump signal $P_3$ ($\lambda_3$) and polarization controller $PC_3$. The DCM 501 would now include all of the elements shown in 330 of FIG. 3 with dispersion compensation utilized in all of the paths that the wavelengths $\lambda_1$, $\lambda_2$, and $\lambda_2$ travel. Again the operation of three-pump phase conjugator apparatus of FIG. 5 with a wavelength $\lambda_3$ is essentially the same as that described above for the three-pump phase conjugator apparatus of FIG. 3 with a wavelength $\lambda_3$. Thus, the operation will depend on whether 23 is co-phased or counter-phased to $\lambda_1$ and $\lambda_2$, respectively.

The generalized three-pump phase conjugator apparatus shown in FIG. 6 also includes the additional third pump signal $P_3$ ($\lambda_3$) and polarization controller $PC_3$. Again the operation of three-pump phase conjugator apparatus of FIG. 6 with a wavelength $\lambda_3$ is essentially the same as that described above for the three-pump phase conjugator apparatus of FIG. 3 with a wavelength $\lambda_3$.

While our multi-pump phase conjugator apparatus of the present invention has been discussed as using two or three wavelengths, it should be understood that it may use three or more wavelengths. Thus, what has been described is illustrative of the present invention. Various modifications of our invention will occur to those skilled in the art. Nevertheless all deviations from the specific teachings of this specification that basically rely upon the principles and their equivalents are properly considered within the scope of the invention as described and claimed.

We claim:

1. A multi-pump phase modulation apparatus comprising:
   means for receiving multiple optical wavelength pump signals;
   a single phase modulator for phase modulating the multiple pump signals to form phase modulated multiple pump signals wherein the phase modulator uses a modulation signal that includes a bit sequence, formed into words;
   a wavelength selective signal splitter for separating the phase modulated multiple pump signals into at least two wavelength groups;
   a delay apparatus that delays the first wavelength group relative to other wavelength groups by the modulation period equal to an integer multiple of the word length; and
   a combiner for combining the delayed first wavelength group with the other wavelength groups to form a combined modulated multiple pump signal.

2. The multiple pump phase modulation apparatus of claim 1 where the delay apparatus includes a predetermined length of optical fiber.

3. A multi-pump phase modulation apparatus comprising:
   means for receiving multiple optical wavelength pump signals;
   a single phase modulator for phase modulating the multiple pump signals to form phase modulated multiple pump signals wherein the phase modulator uses a modulation signal that includes a bit sequence, formed into words;
   a wavelength selective signal splitter for separating the phase modulated multiple pump signals into at least two wavelength groups;
   a delay apparatus that delays the first wavelength group relative to other wavelength groups by the modulation period approximately equal to an integer multiple of the word length;
   a variable bit rate signal generator for generating the bit sequence where the bit rate is varied so that an integer multiple of word length is equal to the delay of the delay apparatus; and
   a combiner for combining the delayed first wavelength group with the other wavelength groups to form a combined modulated multiple pump signal.

4. A multi-pump phase modulation apparatus comprising:
   means for receiving multiple optical wavelength pump signals;
   a single phase modulator for phase modulating the multiple pump signals to form phase modulated multiple pump signals wherein the phase modulator uses a modulation signal that includes a pseudo-random bit sequence, PRBS, formed into words;
   a wavelength selective signal splitter for separating the phase modulated multiple pump signals into at least two wavelength groups;
   a delay apparatus that delays the first wavelength group relative to other wavelength groups by the modulation period equal to an integer multiple of the word length; and
   a combiner for combining the delayed first wavelength group with the other wavelength groups to form a combined modulated multiple pump signal.

5. A multi-pump phase modulation apparatus comprising:
   means for receiving multiple optical wavelength pump signals;
   a single phase modulator for phase modulating the multiple pump signals to form phase modulated multiple pump signals wherein the phase modulator uses a modulation signal that includes a pseudo-random bit sequence, PRBS, formed into words;
   a wavelength selective signal splitter for separating the phase modulated multiple pump signals into at least two wavelength groups;

a delay apparatus that delays the first wavelength group relative to other wavelength groups by the modulation period approximately equal to an integer multiple of the word length;

a variable bit rate signal generator for generating the PRBS where the bit rate is varied so that an integer multiple of word length is equal to the delay of the delay apparatus; and a combiner for combining the delayed first wavelength group with the other wavelength groups to form a combined modulated multiple pump signal.

6. A multi-pump phase modulation apparatus comprising:

means for receiving multiple optical wavelength pump signals;

a single phase modulator for phase modulating the multiple pump signals to form phase modulated multiple pump signals wherein the phase modulator uses a modulation signal that is a periodic analog function where the second half period is the complement of the first half period;

a wavelength selective signal splitter for separating the phase modulated multiple pump signals into at least two wavelength groups;

a delay apparatus that delays the first wavelength group relative to other wavelength groups by a delay that is equal an integer multiple of the half period; and a combiner for combining the delayed first wavelength group with the other wavelength groups to form a combined modulated multiple pump signal.

7. A multi-pump phase modulation apparatus comprising:

means for receiving multiple optical wavelength pump signals;

a single phase modulator for phase modulating the multiple pump signals to form phase modurated multiple pump signals wherein the phase modulator uses a modulation signal that is a periodic analog functions;

a wavelength selective signal splitter for separating the phase modulated multiple pump signals into at least two wavelength groups;

a delay apparatus that delays the first wavelength group relative to other wavelength groups by a delay that is equal to an integer multiple of the period; and a combiner for combining the delayed first wavelength group with the other wavelength groups to form a combined modulated multiple pump signal.

8. A multi-pump phase modulation apparatus comprising:

means for receiving multiple optical wavelength pump signals;

a single phase modulator for phase modulating the multiple pump signals to form phase modulated multiple pump signals wherein the phase modulator uses a modulation signal that is a periodic analog function where the second half period is the complement of the first half period;

a wavelength selective signal splitter for separating the phase modulated multiple pump signals into at least two wavelength groups;

a delay apparatus that delays the first wavelength group relative to other wavelength groups by a delay that is approximately equal an integer multiple of the half period;

a periodic analog function generator for generating a periodic analog function where the period is varied so that an integer multiple of the half period is equal to the delay of the delay apparatus; and a combiner for combining the delayed first wavelength group with the other wavelength groups to form a combined modulated multiple pump signal.

9. A multi-pump phase modulation apparatus comprising:

means for receiving multiple optical wavelength pump signals;

a single phase modulator for phase modulating the multiple pump signals to form chase modulated multiple pump signals wherein the phase modulator uses a modulation signal that is a periodic analog function;

a wavelength selective signal splitter for separating the phase modulated multiple pump signals into at least two wavelength groups;

a delay apparatus that delays the first wavelength group relative to other wavelength groups by a delay that is approximately equal an integer multiple of the period;

a periodic analog function generator for generating a periodic analog function where the period is varied so that an integer multiple of the period is equal to the delay of the delay apparatus; and a combiner for combining the delayed first wavelength group with the other wavelength groups to form a combined modulated multiple pump signal.

10. A multi-pump phase modulation apparatus comprising means for receiving multiple pump wavelength signals;

a single phase modulator for phase modulating the multiple pump wavelength signals to form multiple phase modulated pump wavelength signals using a modulation signal having a predetermined modulation period;

a dispersion compensation module, DCM, for receiving the multiple phase modulated pump wavelength signals and for compensating for chromatic dispersion and/or optical nonlinear effects in the received multiple pump wavelength signals.

11. The multi-pump phase modulation apparatus of claim 10 wherein the DCM comprises a wavelength selective signal splitter for separating the modulated multiple pump wavelength signals into at least two wavelength groups;

a delay apparatus for delaying a first wavelength group by the predetermined modulation period relative to any other wavelength group;

wherein the DCM compensates for chromatic dispersion and/or optical nonlinear effects introduced into at least one of the wavelength groups; and a combiner for combining the delayed first wavelength group with the other wavelength groups to form a combined modulated multiple pump wavelength signal.

12. The multi-pump phase modulation apparatus of claim 10 further comprising a wavelength selective signal splitter for separating the modulated multiple pump wavelength signals into at least two wavelength groups;

a delay apparatus for delaying a first wavelength group by the predetermined modulation period relative to other wavelength groups;

a combiner for combining the delayed first wavelength group with the other wavelength groups to form a combined modulated multiple pump wavelength signal; and wherein the DCM compensates for chromatic dispersion and/or optical nonlinear effects introduced to the combined modulated multiple pump wavelength signal.

13. A multi-pump parametric apparatus comprising:

means for receiving multiple optical wavelength pump signals;

a single phase modulator for phase modulating the multiple pump signals to form phase modulated multiple pump signals wherein the phase modulator uses a modulation signal that includes a bit sequence, formed into words;

a wavelength selective signal splitter for separating the phase modulated multiple pump signals into at least two wavelength groups;

a delay apparatus that delays the first wavelength group relative to other wavelength groups by the modulation period equal to an integer multiple of the word length;

a combiner for combining the delayed first wavelength group with the other wavelength groups to form a combined modulated multiple pump signal; and a parametric apparatus for receiving the combined modulated multiple pump signal and for amplifying an input signal S, and for outputting a signal selected from a group including an amplified input signal and one or more idlers generated by the parametric apparatus.

14. The multi-pump parametric apparatus of claim 13 arranged as an optical switch including a pump amplitude control circuit for turning at least one of the multiple pump signals on and off.

15. The multi-pump parametric apparatus of claim 13 arranged as a sampler including a bandsplitter coupler, C2, for receiving the combined amplified signal and idlers and for selecting at least one of the signal and idler bands to be used as the sample signal.

16. The multi-pump parametric apparatus of claim 13 arranged as a signal extractor for receiving the input signal S in the form of a binary signal and for extracting every $n^{th}$ bit of the binary signal, the signal extractor further including a pump intensity modulator that modulates the intensity of at least one of the combined modulated multiple pump signal using a pump intensity modulation S signal to complete the entire combined multiple pump signal on every $n^{th}$ bit of the binary input signal, and a bit sampler circuit for recovering the dock signal of the binary input signal and for generating the pump intensity modulation signal, and wherein the parametric apparatus receives the binary input signal and the amplitude modulated-combined multiple pump signal and in response forms an output signal generated from every $n^{th}$ bit of the binary input signal.

17. The multi-pump parametric apparatus of claim 13 used as a regenerator, said regenerator further including an output filter, F, tuned to pass a regeneration signal selected from the output signal generated by the parametric apparatus.

18. A method of operating a multi-pump phase modulation apparatus, comprising the steps of:

receiving multiple optical wavelength pump signals;

phase modulating the multiple pump signals to form multiple phase modulated pump signals using a single phase modulator and a modulation signal that includes a bit sequence formed into words;

separating the phase modulated multiple pump signals into at least two wavelength groups;

delaying a first wavelength group relative to other wavelength groups by a modulation period equal to an integer multiple of the word length; and combining the delayed first wavelength, group with the other wavelength groups to form a combined modulated multiple pump signal.

19. A method of operating a multi-pump parametric apparatus using the method of claim 18 further comprising the steps of:

generating a combined modulated multiple pump signal by operating the multi-pump phase modulation apparatus;

receiving the combined modulated multiple pump signal and an input signal S at the parametric apparatus;

amplifying the input signal in the parametric apparatus, and outputting a signal selected from a group including an amplified input signal and one or more idlers generated by the multi-pump parametric apparatus.

* * * * *